(12) United States Patent
DeKeuster

(10) Patent No.: US 9,437,903 B2
(45) Date of Patent: Sep. 6, 2016

(54) METHOD FOR COOLING A LITHIUM-ION BATTERY PACK

(71) Applicant: Johnson Controls Technology Company, Holland, MI (US)

(72) Inventor: Richard M. DeKeuster, Racine, WI (US)

(73) Assignee: Johnson Controls Technology Company, Holland, MI (US)

( * ) Notice: Subject to any disclaimer, the term of this patent is extended or adjusted under 35 U.S.C. 154(b) by 421 days.

(21) Appl. No.: 13/753,221

(22) Filed: Jan. 29, 2013

(65) Prior Publication Data

US 2013/0192807 A1     Aug. 1, 2013

Related U.S. Application Data

(60) Provisional application No. 61/593,210, filed on Jan. 31, 2012.

(51) Int. Cl.
*H05K 7/20*     (2006.01)
*H01M 10/613*   (2014.01)
(Continued)

(52) U.S. Cl.
CPC ...... *H01M 10/5004* (2013.01); *B60L 11/1874* (2013.01); *B60L 11/1877* (2013.01); *H01M 10/613* (2015.04); *H01M 10/625* (2015.04); *H01M 10/6551* (2015.04);
(Continued)

(58) Field of Classification Search
CPC .......... F28D 15/00; F28D 15/02; F28F 1/32; F28F 3/12; H05K 7/20; H01M 10/6552; H01M 10/6556

USPC ............ 165/80.2, 170, 171, 172, 151, 80.1, 165/65.31, 104.25, 173, 175, 176; 361/699, 361/700; 429/120; 126/569
See application file for complete search history.

(56) References Cited

U.S. PATENT DOCUMENTS 3,416,600 A * 12/1968 Fink ...................... F28D 1/0478
                                                          165/175
4,290,413 A *  9/1981 Goodman ................ F24J 2/201
                                                          126/624
(Continued)

FOREIGN PATENT DOCUMENTS

DE        10223782 B4    12/2003
DE      102004005394 A1    8/2005
(Continued)

OTHER PUBLICATIONS

International Search Report and Written Opinion for PCT Application No. PCT/US2013/023876, dated May 16, 2013, 11 pgs.

*Primary Examiner* — Allen Flanigan
*Assistant Examiner* — Gustavo Hincapie Serna
(74) *Attorney, Agent, or Firm* — Fletcher Yoder, P.C.

(57) ABSTRACT

Systems are disclosed for battery modules with cooling systems. In accordance with disclosed embodiments, the cooling system may be disposed against an external surface of a housing of the battery module. The cooling system may utilize a coolant to remove heat generated by cells within the battery module, to prevent the cells from aging prematurely. Embodiments of the cooling system may include cold plates, tubes, fins, and plates, or a combination thereof, which may route the coolant along the surface of the battery module housing. Such features may create a large effective cooling surface against the battery module housing to promote a high heat transfer rate from the cells to the coolant.

12 Claims, 8 Drawing Sheets

(51) Int. Cl.
*B60L 11/18* (2006.01)
*H01M 10/625* (2014.01)
*H01M 10/6556* (2014.01)
*H01M 10/6551* (2014.01)
*H01M 2/10* (2006.01)
*B60K 1/04* (2006.01)
*B60K 1/00* (2006.01)
*H01M 10/647* (2014.01)

(52) U.S. Cl.
CPC ........... *H01M 10/6556* (2015.04); *B60K 1/04* (2013.01); *B60K 2001/005* (2013.01); *H01M 2/1077* (2013.01); *H01M 10/647* (2015.04); *Y02T 10/7005* (2013.01); *Y02T 10/705* (2013.01); *Y02T 10/7011* (2013.01)

(56) References Cited

U.S. PATENT DOCUMENTS

| | | | | |
|---|---|---|---|---|
| 4,526,162 | A * | 7/1985 | Arai | F24J 2/265 126/569 |
| 4,763,727 | A * | 8/1988 | Kreuzer et al. | 165/171 |
| 4,923,004 | A * | 5/1990 | Fletcher | B29C 49/08 165/175 |
| 5,099,576 | A * | 3/1992 | Shinmura | B21D 53/085 165/153 |
| 5,101,561 | A * | 4/1992 | Fuhrmann | B21D 39/20 165/151 |
| 6,170,569 | B1 * | 1/2001 | Dienhart | F28D 1/05366 165/148 |
| 6,725,913 | B2 * | 4/2004 | Memory | F28D 1/05366 165/153 |
| 7,104,314 | B2 * | 9/2006 | Valensa | F28D 7/0033 165/164 |
| 7,516,777 | B2 * | 4/2009 | Terakado et al. | 165/80.4 |
| 7,531,269 | B2 | 5/2009 | Wegner | |
| 7,548,683 | B2 * | 6/2009 | Valensa | C01B 3/382 392/311 |
| 2003/0230399 | A1 * | 12/2003 | Hurlbert et al. | 165/104.25 |
| 2005/0170241 | A1 | 8/2005 | German et al. | |
| 2006/0090886 | A1 * | 5/2006 | Kamiyama et al. | 165/140 |
| 2007/0012423 | A1 * | 1/2007 | Kinoshita et al. | 165/80.4 |
| 2007/0084585 | A1 * | 4/2007 | Takagi et al. | 165/80.4 |
| 2007/0227708 | A1 * | 10/2007 | Hom et al. | 165/121 |
| 2009/0325054 | A1 * | 12/2009 | Payne et al. | 429/120 |
| 2010/0175857 | A1 * | 7/2010 | Gerstler et al. | 165/104.31 |
| 2010/0253923 | A1 * | 10/2010 | Yanagisawa | F28D 15/00 353/54 |
| 2010/0261046 | A1 | 10/2010 | German et al. | |
| 2010/0326750 | A1 * | 12/2010 | Murakami | 180/65.31 |
| 2011/0117410 | A1 * | 5/2011 | Yoon | 429/120 |
| 2011/0132580 | A1 | 6/2011 | Herrmann et al. | |
| 2011/0212355 | A1 | 9/2011 | Essinger et al. | |
| 2011/0247791 | A1 * | 10/2011 | Jiang | F28D 1/047 165/173 |
| 2011/0267778 | A1 * | 11/2011 | Eckstein et al. | 361/704 |
| 2012/0018134 | A1 * | 1/2012 | Polk, Jr. | 165/170 |
| 2012/0231314 | A1 * | 9/2012 | Sohn | H01M 2/1077 429/120 |

FOREIGN PATENT DOCUMENTS

| | | |
|---|---|---|
| DE | 102006015568 B3 | 5/2007 |
| DE | 4345532 B4 | 5/2008 |
| DE | 102007044461 A1 | 3/2009 |
| DE | 102008027293 A1 | 12/2009 |
| DE | 10 2008 059952 A1 | 6/2010 |
| DE | 102009014954 A1 | 10/2010 |
| DE | 10 2010 029872 A1 | 1/2011 |
| DE | 10 2009 040197 A1 | 3/2011 |
| DE | 102009052254 A1 | 5/2011 |
| DE | 10 2010 018040 A1 | 11/2011 |
| DE | 102010029079 A1 | 11/2011 |
| DE | 102010030155 A1 | 12/2011 |
| EP | 2388852 A1 | 5/2011 |
| EP | 2398109 A1 | 6/2011 |
| EP | 2 388 851 A1 | 11/2011 |
| KR | 1020110020446 * | 3/2011 ............ H01M 10/50 |
| WO | 2007115743 A2 | 10/2007 |
| WO | 2009/062710 A1 | 5/2009 |
| WO | 2010112386 A2 | 10/2010 |
| WO | 2011054952 A1 | 5/2011 |

* cited by examiner

METHOD FOR COOLING A LITHIUM-ION BATTERY PACK

CROSS REFERENCE TO RELATED APPLICATIONS

This application claims priority from and the benefit of U.S. Provisional Application Ser. No. 61/593,210, entitled "Method for Cooling a Lithium-Ion Battery Pack," filed Jan. 31, 2012, which is hereby incorporated by reference for all purposes.

FIELD OF THE DISCLOSURE

The present disclosure relates generally to the field of batteries and battery modules. More specifically, the present disclosure relates to a cooling system and method for battery modules that may be used particularly in vehicular contexts, as well as other applications.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles using electric power for all or a portion of their motive power may provide numerous advantages as compared to traditional vehicles powered by internal combustion engines. For example, vehicles using electric power may produce fewer pollutants and may exhibit greater fuel efficiency. In some cases, vehicles using electric power may eliminate the use of gasoline entirely and derive the entirety of their motive force from electric power. As technology continues to evolve, there is a need to provide improved power sources, particularly battery modules, for such vehicles. For example, it is desirable to provide effective cooling to the battery modules to prevent premature aging of individual battery cells within the battery module. It is also desirable to provide a cooling system design that is easily adaptable to fit a variety of battery modules.

Vehicles using electric power for at least a portion of their motive force may derive their electric power from the multiple individual battery cells packaged into the battery modules. The individual cells may utilize lithium-ion chemistry and may be packaged into cylindrical or prismatic casings. The battery modules may contain the multiple individual cells within a generally rectangular housing. As the individual cells are charged and discharged, they may generate heat due to Joule heating caused by current flowing through the internal resistance of the cells. In addition, the individual cells may be subjected to heating via exothermic chemical reactions occurring within the cells. Further, in some cases, elevated ambient temperatures may add heat to the cells via conduction, convection, and/or radiation. These (and other potential) sources of thermo-electrical, thermo-chemical, and environmental heating may cause increased localized temperatures of the cells. The increase in temperature may be aggravated by the tight packaging of multiple cells within the confined space of the battery module housing. Increased temperatures may increase the rate of chemical reactions, cause physical distortion (e.g., swelling, short circuits, open circuits), that may prematurely age the cells and the battery module. Accordingly, it would be desirable to provide an effective cooling system with a large cooling surface to contact the housing of the module and draw excess heat away from the module, thereby preserving the cells and the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present systems may be adapted to a wide range of settings and may be particularly well suited to vehicles deriving at least a portion of their motive force from electric power. Moreover, the cooling systems may be useful in other applications, such as power storage for alternative energy sources, portable battery modules, and back-up power supplies.

Embodiments of the present disclosure relate to cooling systems for battery modules having multiple individual battery cells. In accordance with disclosed embodiments, the cooling system may include a cold plate with a fluid circuit that may route a coolant through the cold plate. The cold plate may be abutting a wall of the battery module housing. In one embodiment, the cooling system may include a plurality of parallel cross flow tubes that provide fluid communication between two header pipes. The cross flow tubes and header pipes may convey a coolant along an external surface of the battery module housing. Further, the cross flow tubes may be subjected to an external flow of air to provide additional cooling.

Various refinements of the features noted above may exist in relation to the presently disclosed embodiments. Additional features may also be incorporated in these various embodiments as well. These refinements and additional features may exist individually or in any combination. For instance, various features discussed below in relation to one or more embodiments may be incorporated into other disclosed embodiments, either alone or in any combination. Again, the brief summary presented above is intended only to familiarize the reader with certain aspects and contexts of embodiments of the present disclosure without limitation to the claimed subject matter.

DRAWINGS

Various aspects of this disclosure may be better understood upon reading the following detailed description and upon reference to the drawings in which.

DETAILED DESCRIPTION

Figure 1:
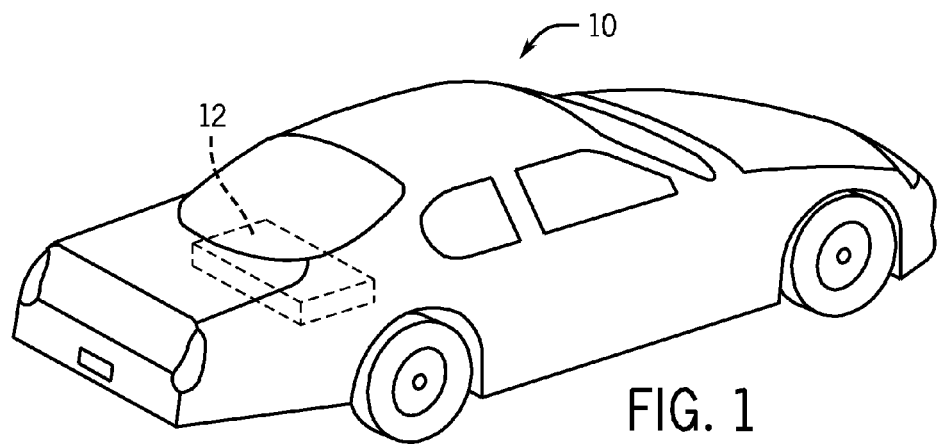
FIG. 1 is perspective view of an embodiment of a vehicle having a battery module contributing all or a portion of the motive power for the vehicle.

The term "xEV" is defined herein to include vehicles that use electric power for all or a portion of their vehicular motive force, including, but not limited to, the following vehicles. As will be appreciated by those skilled in the art, hybrid electric vehicles (HEVs) combine an internal combustion engine propulsion system and a battery-powered electric propulsion system. The term HEV may include any variation of a hybrid electric vehicle, such as micro-hybrid and mild hybrid systems, which disable the internal combustion engine when the vehicle is idling and utilize a battery system to continue powering the air conditioning unit, radio, or other electronics, as well as to kick-start the engine when propulsion is desired. The mild hybrid system may apply some level of power assist to the internal combustion engine, whereas the micro-hybrid system may not supply power assist to the internal combustion engine. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses one or more motors powered by electric energy for its propulsion.

As described in more detail below, disclosed herein are embodiments of cooling systems for battery modules, which may be well suited to xEV applications. Embodiments of the cooling system provided herein may include a cold plate with a fluid coolant circuit. The cold plate may be placed in contact with an external surface of the battery module housing and/or the battery cells themselves. Other embodiments of the cooling system may include multiple parallel cross flow tubes that create a coolant circuit along an external surface of the battery module housing. The cooling systems described herein may provide a large effective cooling surface to remove heat from the battery modules, without drastically increasing the weight of the battery modules. Further, the cooling systems may be easily configurable to fit a variety of battery module designs.

The battery modules that include the cooling system may be easily configured for use in xEVs. In certain embodiments, the xEV may include at least one battery module, and each battery module may include the cooling system to remove excess heat and prevent premature aging of the individual cells within the battery modules. Removing heat from the modules, and consequently the individual cells, may enable the cells to facilitate higher currents without exceeding set temperature limits. Further, the removed heat may be recovered and repurposed for other applications throughout the xEV. For example, the waste heat may be used to warm the passenger compartment or defrost the windshield during cold weather.

Turning now to the drawings, FIG. 1 is a perspective view of a vehicle 10 in the form of an automobile (e.g., a car) having a battery module 12 for contributing all or a portion of the motive power for the vehicle 10. The battery module 12 may be constructed from multiple individual cells and may include one or more cooling systems as described above. Although illustrated as an automobile in FIG. 1, the type of the vehicle 10 may be implementation-specific, and, accordingly, may differ in other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power. For the purposes of the present disclosure, it should be noted that the battery modules 12 and battery module accessories illustrated and described herein are particularly directed to providing and/or storing energy in xEVs. However, embodiments of the battery modules 12 having the cooling systems may be utilized in other, non-vehicular applications as well.

Further, although the battery module 12 is illustrated in FIG. 1 as being positioned in the trunk or rear of the vehicle 10, according to other embodiments, the location of the battery module 12 may differ. For example, the position of the battery module 12 may be selected based on the available space within the vehicle 10, the desired weight balance of the vehicle 10, the location of other components within the vehicle 10, and a variety of other implementation-specific considerations.

Figure 2:
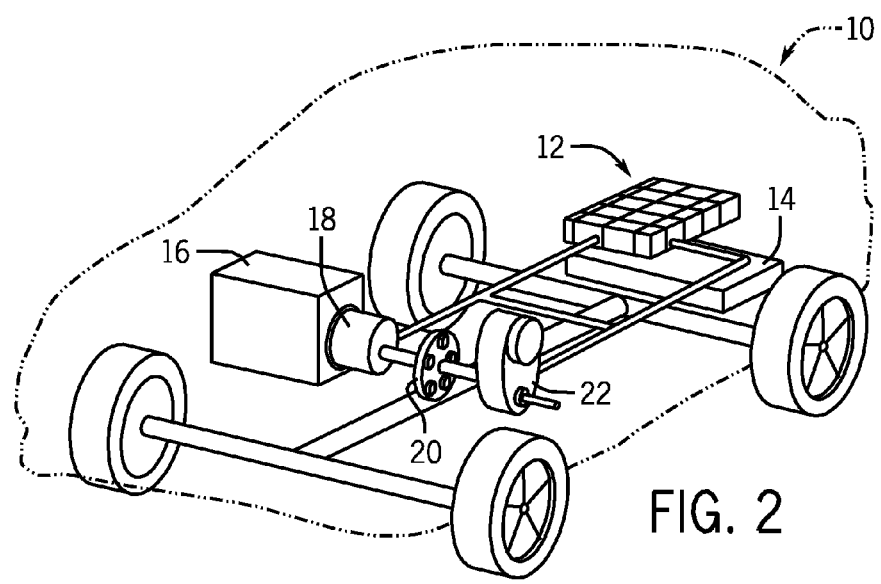
FIG. 2 illustrates a cutaway schematic view of an embodiment of the vehicle of FIG. 1 provided in the form of a hybrid electric vehicle.

For purposes of discussion, it may be helpful to discuss the battery module 12 with respect to a particular type of xEV, for example, an HEV. FIG. 2 illustrates a cutaway schematic of the vehicle 10 provided in the form of an HEV. In the illustrated embodiment, the battery module 12 is provided toward the rear of the vehicle 10 near a fuel tank 14. The fuel tank 14 supplies fuel to an internal combustion engine 16, which is provided for the instances when the HEV utilizes gasoline power to propel the vehicle 10. An electric motor 18, a power split device 20, and a generator 22 are also provided as part of the vehicle drive system. Such an HEV may be powered or driven by only the battery module 12, by only the engine 16, or by both the battery module 12 and the engine 16.

Figure 3:
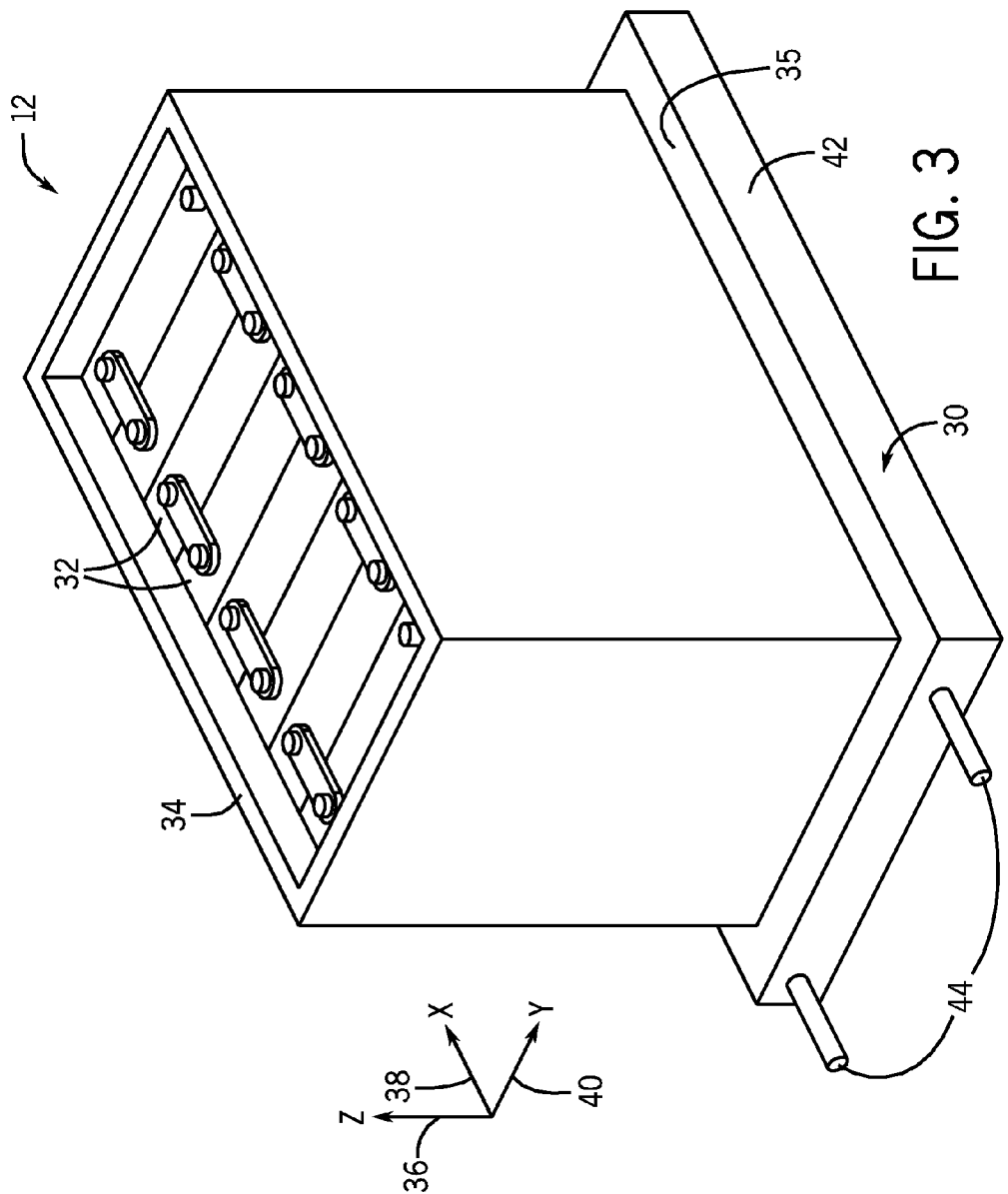
FIG. 3 is a perspective view of an embodiment of a battery module having a cooling system.

As previously described, each battery module 12 may include a cooling system that removes excess heat generated by the individual cells within a housing of the battery module 12. An embodiment of a battery module 12 having such a cooling system 30 is illustrated in FIG. 3. The battery module 12 may include multiple individual cells 32 contained within a housing 34, which may generate heat during normal operation. Although pictured in prismatic form, the cells 32 may be cylindrical in alternative embodiments. Further, the housing 34 may accommodate any number of cells 32, as determined by implementation-specific considerations. The cells 32 may be physically contacting the housing 34, such that heat generated by the cells 32 is conductively transferred to the housing 34. Accordingly, the casing of the cells 32 and the housing 34 may be in conductive contact.

As depicted, a cooling surface 35 of the cooling system 30 may be in contact with an external surface of the housing 34 of the battery module 12 to receive the excess heat via conduction. Particularly, when the cells 32 are in prismatic form, it may be advantageous to dispose the cooling surface 35 directly beneath the battery module 12 due to high thermal conductivity in the z-direction 36 as opposed to the x-direction 38 and the y-direction 40. For example, the coefficient of thermal conductivity may be approximately 3 to 7 times larger in the z-direction 36 as compared to the x-direction 38 and the y-direction 40. However, in alternative embodiments, the cooling surface 35 may be disposed against any external surface of the housing 34 of the battery module 12. For example, the cooling surface 35 may be disposed against a different external surface of the housing 34 due to space constraints within the vehicle 10.

The cooling system 30 may be a cold plate 42 constructed from a thermally conductive material, such as aluminum, steel, a different metal, and/or graphene containing materials, which acts as a heat sink for the excess heat generated within the cells 32. To enhance the heat transfer achieved by the cold plate 42, the cold plate 42 may circulate a fluid coolant, provided via headers 44. The addition of the coolant may provide high cooling rates, particularly if the coolant has a high thermal capacity. High thermal capacity fluids that may be utilized as coolants include water, ethylene glycol, diethylene glycol, propylene glycol, polyalkylene glycol, betaine, various oils, refrigerants, and the like. Further, gases such as air, carbon dioxide, and nitrogen may be used as coolants within the cold plate 42 when minimizing weight of the cooling system 30 is a primary concern.

Figure 4:
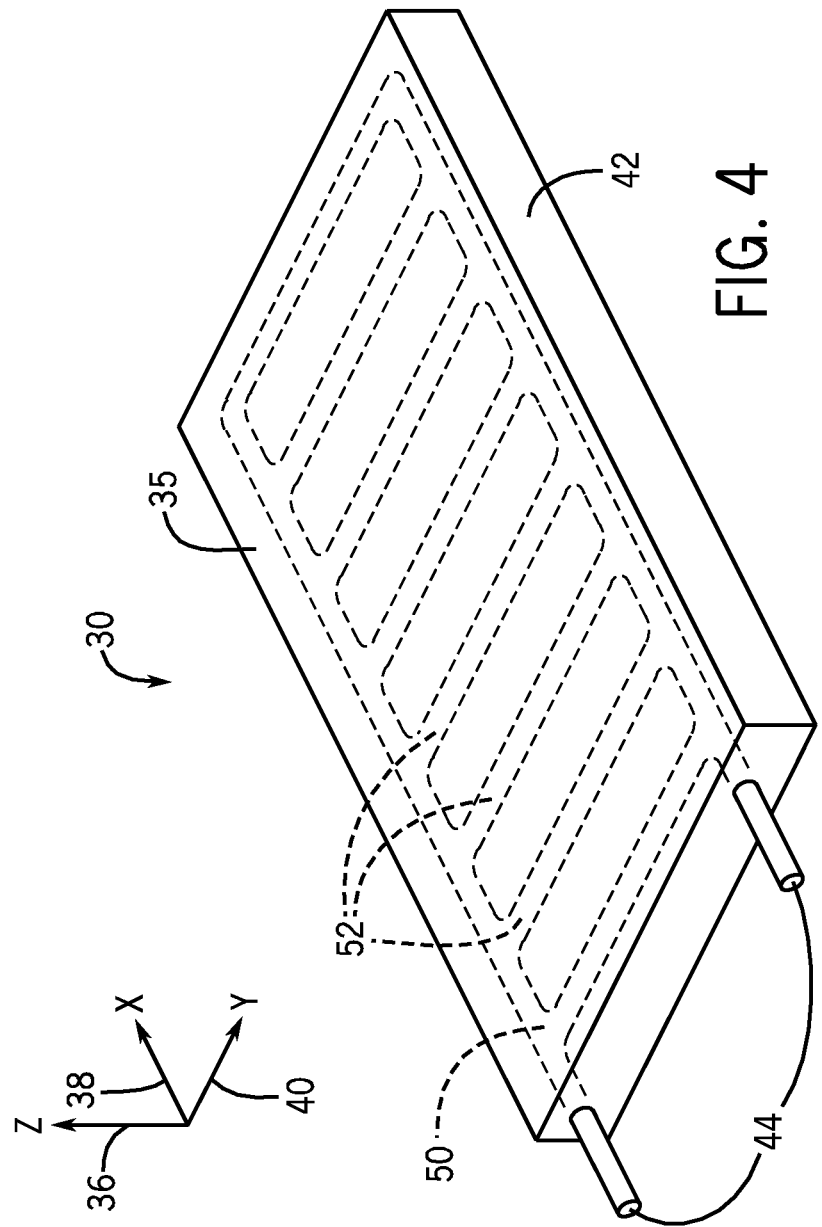
FIG. 4 is a perspective view of an embodiment of the cooling system of FIG. 3, wherein the cooling system includes a cold plate.

The cold plate 42 may contain internal cooling routes 50, as depicted in FIG. 4. The internal cooling route 50 may circulate the coolant provided via the headers 44. In the depicted embodiment, the internal cooling route 50 includes multiple cross flow branches 52, which extend across the cold plate 42 in the y-direction 40 (e.g., perpendicular to the headers 44). The cross flow branches 52 may be sized and spaced to produce optimal heat transfer between the coolant and the cold plate 42, with respect to implementation considerations (e.g., cost, weight, particular geometry, etc.). For example, if a coolant with a high thermal capacity is used, fewer cross flow branches 52 may be desired. Alternatively, if a very high cooling rate is desired, the number of cross flow branches 52 may be increased.

The cold plate 42 may provide a flexible design that is easily adapted for a variety of battery modules 12. The dimensions of the cold plate 42 may be easily scaled to fit the dimensions of the associated battery module 12. Further, for battery modules 12 that generate more heat, the cold plate 42 may incorporate a coolant with a high thermal capacity, an increased number of cross flow branches 50, larger cross flow branches 50, or a combination thereof. Further, the location of the headers 44 may be adjustable to add increased flexibility to the cooling system 30. Although shown disposed at one end of the cooling plate 42, the headers 44 may be disposed on any surface of the cooling plate 42. Generally, one of the headers 44 may act as an inlet, taking in fresh coolant and the other header 44 may act as an outlet, discharging used coolant. In some embodiments, the inlet header 44 and the outlet header 44 may be disposed on different surfaces of the cooling plate 42. The headers 44 may connect with pumps, reservoirs, or other cooling/heating systems within the vehicle 10.

Figure 5:
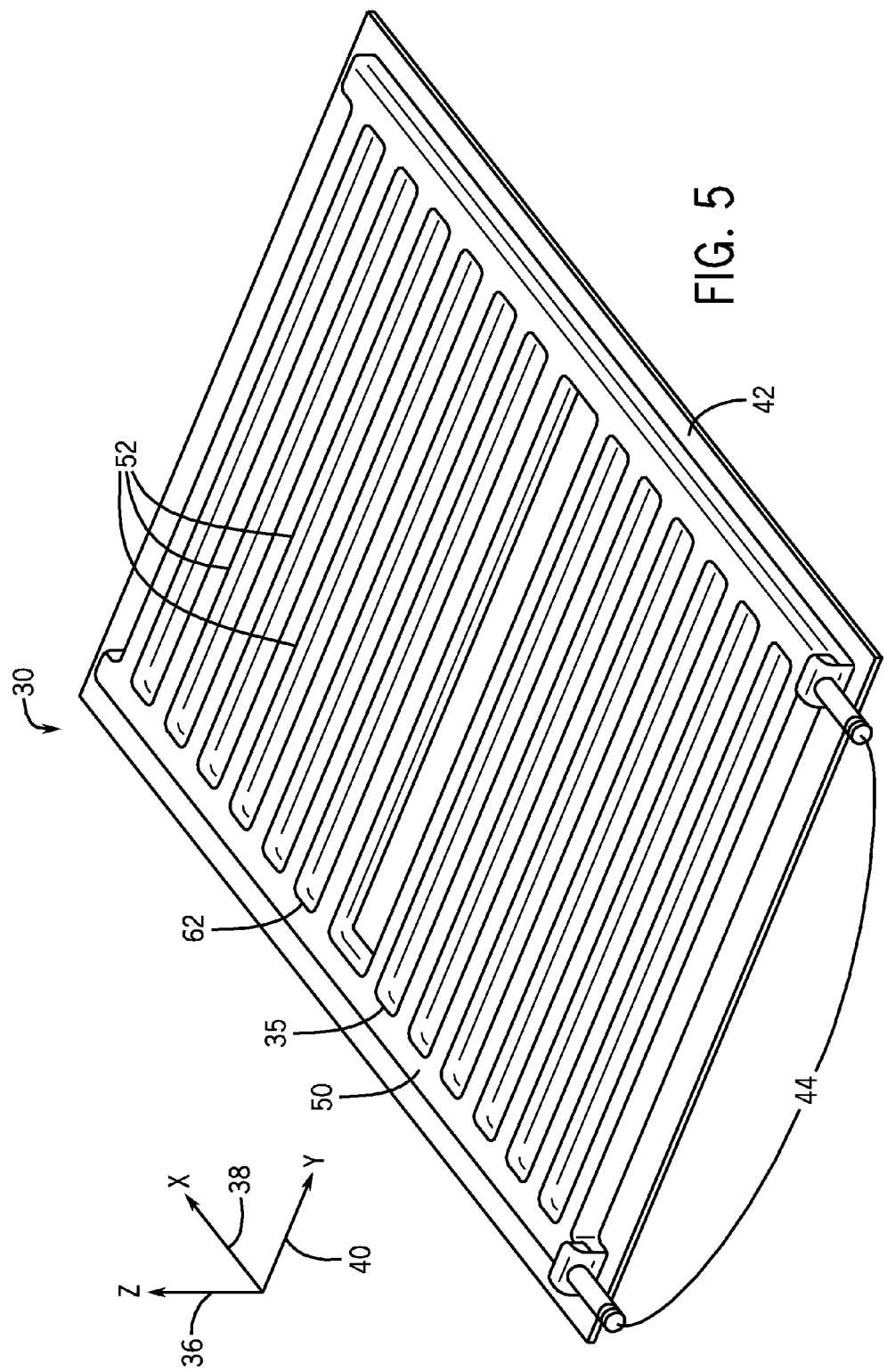
FIG. 5 is a perspective view of an embodiment of the cooling system of FIG. 3, wherein the cooling system includes a modified cold plate.

An alternative embodiment of the cold plate 42 is presented in FIG. 5. The embodiment depicted in FIG. 5 may be preferred when it is desirable to minimize material usage or weight associated with the cooling system 30. The cold plate 42 may include a flat bottom surface 60 and a raised surface 62, which acts as the cooling surface 35. The raised surface 62 may extend in the z-direction 36 to form the cooling routes 50 that circulate the coolant throughout the cold plate 42. The raised surface 62 may be placed in contact with the housing 34 of the battery module 12. In this way, the weight and the amount of material used to create the cooling system 30 may be minimized, while the effective cooling surface (e.g., the proportion of the surface contacted by the coolant) may be increased.

In the depicted embodiment, the cooling routes 50 are in the form of the cross flow branches 52, mimicking a parallel flow heat exchanger. However, the raised surface 62 may incorporate other geometries as determined by implementation considerations. The cooling routes 50 may be formed by extrusion, casting, milling, or other machining processes. The headers 44 may be formed as part of the cooling plate 42, or may be formed separately and coupled to the cooling plate 42.

Figure 6:
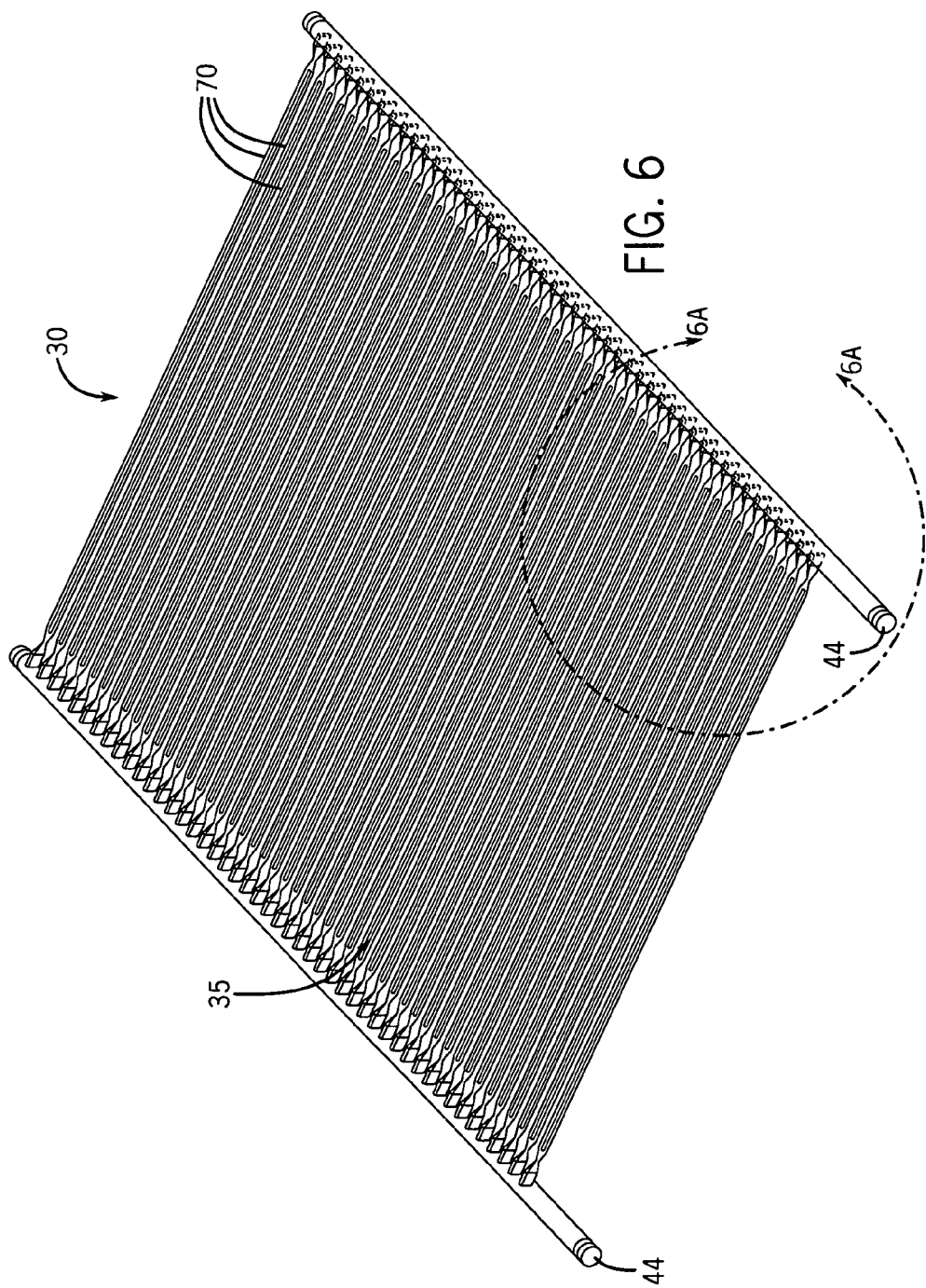
FIG. 6 is a perspective view of an embodiment of the cooling system of FIG. 3, wherein the cooling system includes a plurality of tubes.

In other embodiments, the cooling surface 35 may be formed from a plurality of coolant containing tubes, without the use of the surrounding plate-like structure. Accordingly, FIG. 6 depicts the cooling system 30 formed with a series of cross flow tubes 70 disposed between the headers 44. The coolant may enter one of the headers 44, flow through the cross flow tubes 70, and exit the cooling system 30 via the other header 44. In this way, fresh coolant may steadily be supplied to the battery module 12 for continuous and effective cooling, preventing excess aging or degradation of the cells 32 due to overheating. The cooling surface 35 generally may have the tubes 70 evenly spaced to provide uniform cooling. However, when desirable, the tubes 70 may be arranged to provide preferential cooling to hot zones of the battery module 12. Further, to accommodate differently sized battery modules 12, tubes 70 may be added or removed from the cooling system 30.

Figure 6A:
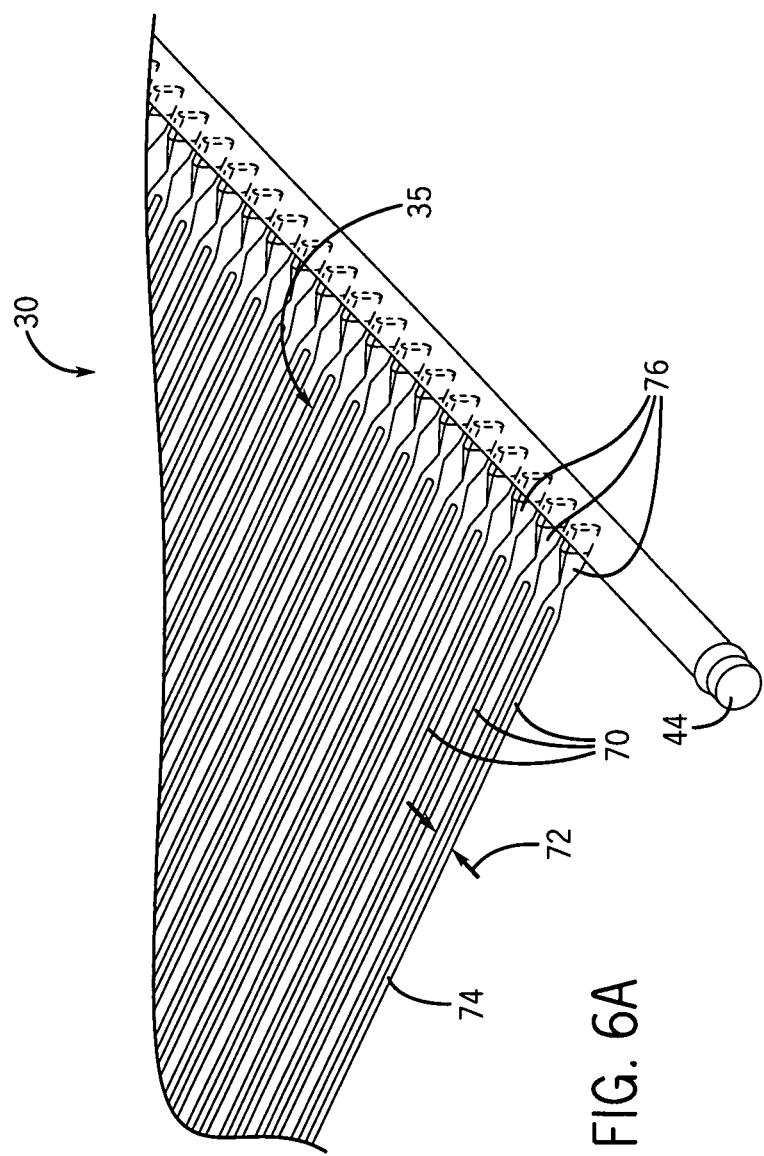
FIG. 6A is a detailed perspective view of the cooling system of FIG. 6.

A detailed view of the cross flow tubes 70 is depicted in FIG. 6A. The tubes 70 may have an approximately elliptical cross-section, wherein each tube 70 has a major diameter 72 and a minor diameter 74. To provide a more effective cooling surface 35, it may be desirable to arrange the tubes 70 such that the major diameter 72 of each tube is disposed against the external surface of the housing 34. For ease of manufacturing and assembly, and to fit the tubes 70 tightly together along the headers 44, the tubes 70 may include a twist 76 at each end (e.g., where each tube 70 connects to each header 44). The twist 76 may be approximately 90°, such that the major diameters 72 of the tubes 70 are vertically disposed where they connect to the headers 44, and the major diameters 72 of the tubes 70 are horizontally disposed along the cooling surface 35. In this way, more tubes 70 may be fit along the headers 44, thereby increasing the size of the cooling surface 35.

Figure 7:
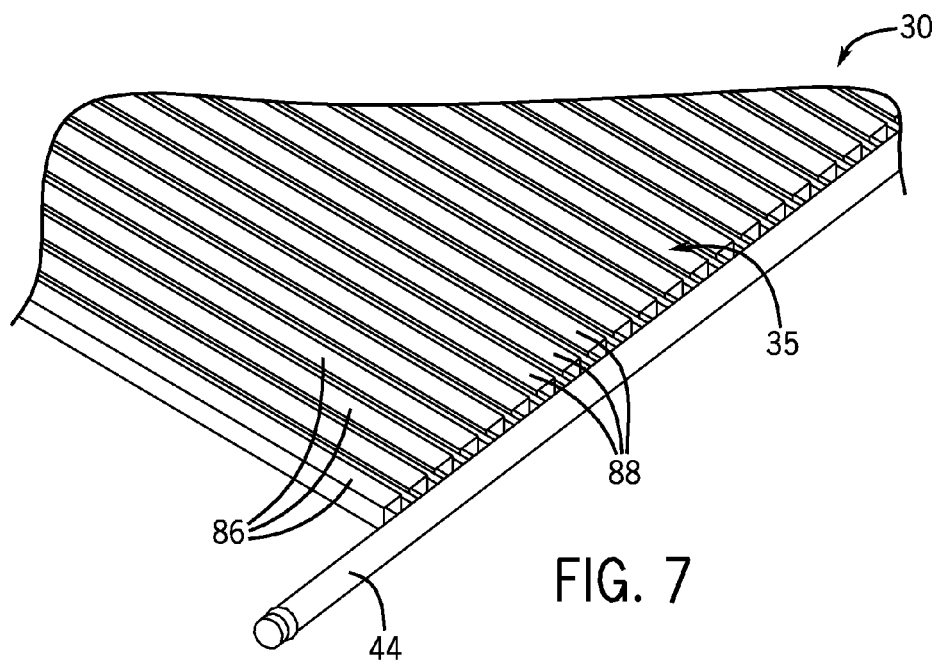
FIG. 7 is a detailed perspective view of an embodiment of the cooling system of FIG. 3, wherein the cooling system includes a plurality of fins.

To further increase the amount of effective cooling surface and the heat removal rate from the battery module 12, fins or other heat removal accessories may be included in the cooling system 30, as depicted in FIG. 7. Fins 86 may be formed to have rectangular surfaces 88 that are raised, with respect to the headers 44. In this way, the raised rectangular surfaces 88 of the fins 86 may form the cooling surface 35, which may contact the external surface of the housing 34, and remove heat generated by the cells 32 via conduction and convection. The fins 86 may be used alone or in conjunction with a coolant circuit. In other embodiments, the fins 86 may have different geometries. For example, the rectangular surfaces 88 may be larger, smaller, or may be more raised.

Figure 8:
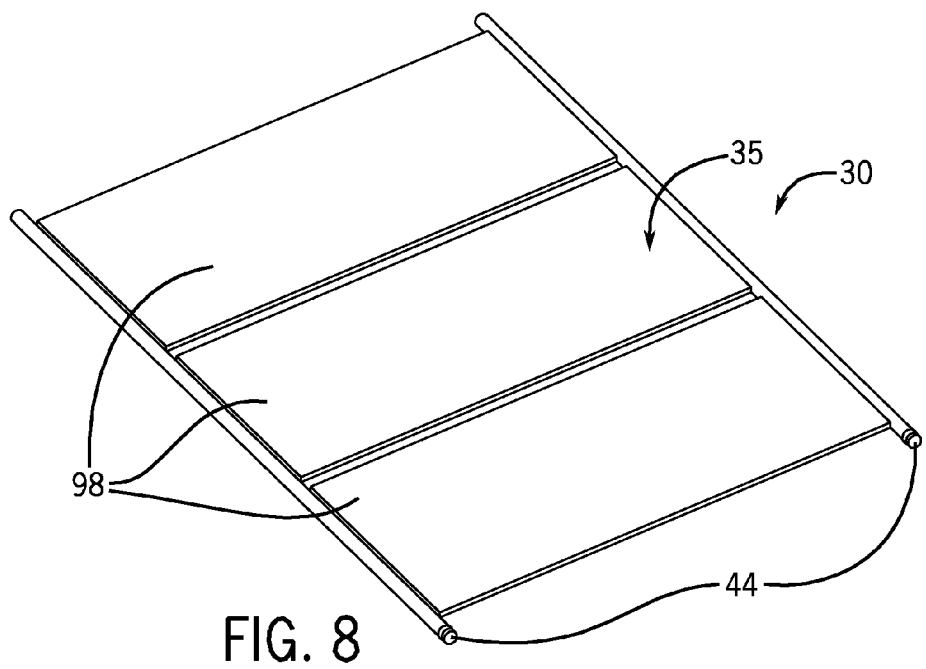
FIG. 8 is a perspective view of an embodiment of the cooling system of FIG. 3, wherein the cooling system includes a plurality of hollow plates.
Figure 8A:
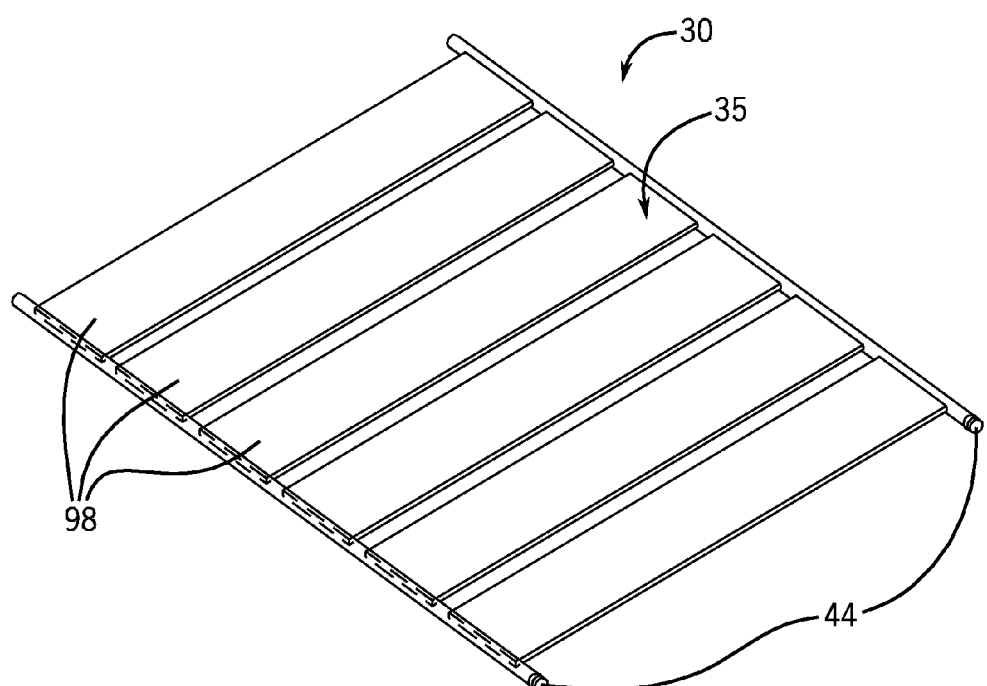
FIG. 8A is a perspective view of an alternative embodiment of the cooling system of FIG. 8.

In another embodiment of the cooling system 30, such as provided in FIG. 8, the tubes 70 may be replaced with hollow plates 98. The plates 98 may be arranged in cross-flow (e.g., perpendicularly) with the headers 44, such that coolant flows into one header 44 (e.g., inlet), through the plates 98, and exits via the other header 44 (e.g., outlet). The plates 98 may form the cooling surface 35 and be placed in direct contact with the housing 34 of the battery module 12. The large surface area of the plates 98 may be desirable to create a large cooling surface 35 between the plates 98 and the housing 34. In this way, the cooling system 30 may effectively remove heat generated by the cells 32 within the housing 34. Further, the plates 98 may be simpler and more cost effective to manufacture, as compared to the tubes 70, since they are larger and fewer are used. In the depicted embodiment, three plates 98 are contained between the headers 44. However, in alternative embodiments, fewer or more plates 98 may be used within the cooling system 30 to accommodate variously sized battery modules 12. For example, as shown in FIG. 8A, six plates 98 may be contained between the headers 44. Further, the plates 98 may be combined with the tubes 70 and/or the fins 86 in alternative embodiments of the cooling system 30.

References herein to the positions of elements (e.g., "top," "bottom," "above," "below," etc.) are merely used to describe the orientation of various elements in the figures. It should be noted that the orientation of various elements may differ according to other embodiments, and that such variations are intended to be encompassed by the present disclosure.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A cooling system for a battery module, comprising:
    a cold plate being generally rectangular in shape and formed from a conductive material;
    a cooling route created within the cold plate; and
    two headers disposed at least partially external to the cold plate, at least partially internal to the cold plate, and parallel with one another; and
    cross flow branches of the cooling route, wherein the cross flow branches are in fluid communication with the two headers, wherein the cross flow branches extend between and perpendicular to the two headers, wherein each cross flow branch comprises an elliptical cross-sectional shape having a major diameter and a minor diameter smaller than the major diameter, and wherein each cross flow branch comprise an approximately 90° twist proximate to each header such that the major diameter of the elliptical cross-sectional shape of each cross flow branch is substantially parallel with longitudinal axes of the two headers between the approximately 90° twists and substantially perpendicular with the longitudinal axes of the two headers outside of the approximately 90° twists.

2. The cooling system of claim 1, wherein the cold plate is configured to be disposed adjacent to the battery module and in physical contact with the battery module.

3. The cooling system of claim 2, wherein the cold plate is configured to be disposed directly beneath and in physical contact with the battery module.

4. The cooling system of claim 1, wherein the battery module comprises multiple individual battery cells.

5. The cooling system of claim 1, wherein one header of the two headers comprises an inlet to the cross flow branches of the cooling route and the other header of the two headers comprises an outlet of the cross flow branches of the cooling route.

6. The cooling system of claim 1, wherein the cold plate comprises a flat surface and a raised surface extending from the flat surface, wherein the raised surface comprises the cross flow branches.

7. A battery module comprising:
    a module housing and a cooling system configured to receive heat from the module housing via conduction; and
    wherein the cooling system comprises a cooling surface being generally rectangular in shape and formed from a conductive material, the cooling surface having a cooling route created within a cold plate, and wherein the cooling system comprises two headers disposed at least partially external to the cold plate, at least partially internal to the cold plate, and parallel with one another; and
    cross flow branches of the cooling route, wherein the cross flow branches are in fluid communication with the two headers, wherein the cross flow branches extend between and perpendicular to the two headers, wherein each cross flow branch comprises an elliptical cross-sectional shape having a major diameter and a minor diameter smaller than the major diameter, and wherein each cross flow branch comprises an approximately 90° twist proximate to each header such that the major diameter of the elliptical cross-sectional shape of each cross flow branch is substantially parallel with longitudinal axes of the two headers between the approximately 90° twists and substantially perpendicular with the longitudinal axes of the two headers outside of the approximately 90° twists.

8. The battery module of claim 7, wherein the cold plate is disposed adjacent to and in physical contact with the battery module housing.

9. The battery module of claim 8, wherein the cold plate is configured to be disposed directly beneath and in physical contact with the module housing.

10. The battery module of claim 7, comprising multiple individual battery cells having terminal ends and base ends opposite the terminal ends, wherein the cold plate is disposed proximate to the base ends of the multiple individual battery cells.

11. The battery module of claim 7, wherein the cold plate comprises a flat surface and a raised surface extending from the flat surface, wherein the raised surface comprises the cross flow branches.

12. The battery module of claim 7, wherein one header of the two headers comprises an inlet to the cross flow branches of the cooling route and the other header of the two headers comprises an outlet of the cross flow branches of the cooling route.

* * * * *